UNITED STATES PATENT OFFICE.

AMOS M. COX, OF LOS ANGELES, CALIFORNIA, ASSIGNOR OF ONE-HALF TO HORACE METCALF, OF LOS ANGELES, CALIFORNIA.

EUCALYPTUS-OIL SOLUTION AND PROCESS FOR THE MANUFACTURE THEREOF.

971,359. Specification of Letters Patent. Patented Sept. 27, 1910.

No Drawing. Application filed March 25, 1910. Serial No. 551,416.

*To all whom it may concern:*

Be it known that I, AMOS M. COX, a citizen of the United States, residing at Los Angeles, in the county of Los Angeles and State of California, have invented a new and useful Eucalyptus-Oil Solution and Process for the Manufacture Thereof, of which the following is a specification.

This invention relates to a eucalyptus oil solution especially adapted for use in paints, varnishes and the like, but its use is not confined to those particular substances, the oil solution being useful for various other purposes.

For the use above noted it is necessary that the oil be dissolved in some carrier, such as benzin or kerosene, but these liquids are not a sufficient solvent to dissolve the oil directly from the plant growth. For this reason a cutting or dissolving agent is used. In the present form phenol or carbolic acid, $C_6H_6O$, is used, this substance having been found to be very efficient in dissolving the eucalyptus oil. Other agents of a like nature and action may be used as occasion demands.

In the actual practice of my process the plant growth is first taken and crushed or cut so as to expose its oil bearing interior. When this is done the severed particles are placed in a solution of benzin or kerosene and carbolic acid, or in a solution of the equivalents thereof. In the present practice this solution is prepared by dissolving one pound of carbolic acid in about five gallons of kerosene, or, equivalently, one pound of carbolic acid in approximately thirty three and one half pounds of kerosene. The solution is effected by slightly warming the kerosene and acid. This finished solution is poured over the prepared growth or the growth is placed into it and left for some days. The solution dissolves the eucalyptus oil in proportions varying with the amount of growth placed in a given amount of solution and with the time allowed for the action.

The resultant solution of eucalyptus oil is a thin oily liquid having the peculiar odor of the eucalyptus oil itself. The odor of the other ingredients does not appear in the final solution. The liquid is yellow in color and transparent.

The main use of the liquid is as a liquid constituent for stains. Certain coloring matters are dissolved or carried in suspension in the liquid for giving finishes of different colors. When used in this capacity the benzin or kerosene becomes a carrier for the other ingredients soaking into the wood and evaporating after the stain has been applied. This carrier may be varied in nature to suit different requirements. For the present I prefer to utilize the above named substances or any other of the products of petroleum distillation of a specific gravity approximating seven or eight tenths.

Having described my invention, I claim:—

1. The herein described process for obtaining a solution of eucalyptus oil, comprising first exposing the oil bearing portions of the eucalyptus growth, and then placing such portions in contact with an oil dissolving liquid dissolved in a volatile liquid.

2. The herein described process for obtaining a solution of eucalyptus oil, comprising first exposing the oil bearing portions of the eucalyptus growth, and then placing such portions in contact with $C_6H_6O$.

3. The herein described process for obtaining a solution of eucalyptus oil, comprising first exposing the oil bearing portions of the eucalyptus growth, and then placing such portions in contact with $C_6H_6O$ dissolved in a volatile liquid.

4. The herein described process for obtaining a solution of eucalyptus oil, comprising first exposing the oil bearing portions of the eucalyptus growth, and then placing such portions in contact with $C_6H_6O$ dissolved in a petroleum distillate.

5. The herein described process for obtaining a solution of eucalyptus oil, comprising first exposing the oil bearing portion of the eucalyptus growth, and then placing such portions in contact with $C_6H_6O$ dissolved in a petroleum distillate of approximately seven to eight tenths specific gravity.

6. The herein described process for obtaining a solution of eucalyptus oil, comprising first exposing the oil bearing portions of the eucalyptus growth, and then placing such portions in contact with a solution of $C_6H_6O$ in kerosene.

7. The herein described process for obtaining a solution of eucalyptus oil, comprising first exposing the oil bearing portions of the eucalyptus growth, and then placing such portions in contact with $C_6H_6O$ and kerosene in the proportions approximately one pound of $C_6H_6O$ to thirty three and one half pounds of kerosene.

8. As a composition of matter, a solution of eucalyptus oil in $C_6H_6O$.

9. As a composition of matter, a solution of eucalyptus oil in $C_6H_6O$ and kerosene.

10. As a composition of matter, a solution of eucalyptus oil in $C_6H_6O$ and a petroleum distillate.

11. As a composition of matter, a solution of eucalyptus oil in $C_6H_6O$ and a petroleum distillate of approximately seven to eight tenths specific gravity.

12. As a composition of matter, a solution of eucalyptus oil in $C_6H_6O$ and kerosene in the proportion approximately one pound of $C_6H_6O$ to thirty three and one half pounds of kerosene.

13. As a composition of matter, a solution of eucalyptus oil in an oil dissolving liquid dissolved in turn in a volatile liquid.

In witness that I claim the foregoing I have hereunto subscribed my name this 19th day of March 1910.

AMOS M. COX.

Witnesses:
JAMES T. BARKELEW,
A. F. COE.